(12) United States Patent
Lin

(10) Patent No.: US 6,854,401 B2
(45) Date of Patent: Feb. 15, 2005

(54) WORKING TABLE HAVING STABLE SUPPORT

(76) Inventor: Kun Yi Lin, No. 104, Lane 145, Song Ju Road, Bei Tun, Taichung (TW), 406

( * ) Notice: Subject to any disclaimer, the term of this patent is extended or adjusted under 35 U.S.C. 154(b) by 134 days.

(21) Appl. No.: 10/376,154

(22) Filed: Feb. 28, 2003

(65) Prior Publication Data

US 2004/0168619 A1 Sep. 2, 2004

(51) Int. Cl.[7] ............................................. A47B 11/00
(52) U.S. Cl. ........................ 108/143; 108/138; 108/147
(58) Field of Search ................................ 108/138, 143, 108/147, 102, 106, 144.11; 74/422, 425, 490.07, 490.09

(56) References Cited

U.S. PATENT DOCUMENTS

| | | | |
|---|---|---|---|
| 2,193,147 A | * | 3/1940 | Stricker ...................... 108/138 |
| 3,942,254 A | * | 3/1976 | Thompson et al. ......... 33/501.9 |
| 4,709,641 A | * | 12/1987 | Lenger ....................... 108/143 |
| 4,850,563 A | * | 7/1989 | Grout ......................... 108/147 |
| 5,199,778 A | * | 4/1993 | Aoki et al. .................. 108/147 |
| 5,341,700 A | * | 8/1994 | Speranza et al. ........... 108/143 |
| 5,341,751 A | * | 8/1994 | Cuneo et al. ............... 108/143 |
| 5,546,826 A | * | 8/1996 | Yanagisawa ............. 74/490.09 |
| 6,095,906 A | * | 8/2000 | Wang ........................... 451/65 |
| 6,322,432 B1 | * | 11/2001 | Wang ......................... 451/361 |

FOREIGN PATENT DOCUMENTS

| | | | | |
|---|---|---|---|---|
| JP | 02024033 A | * | 1/1990 | ................. 108/143 |
| JP | 06058383 A | * | 3/1994 | ................. 108/143 |

* cited by examiner

*Primary Examiner*—Lanna Mai
*Assistant Examiner*—Hanh V. Tran
(74) *Attorney, Agent, or Firm*—Charles E. Baxley

(57) ABSTRACT

A working table includes a housing, a board slidably received in the housing, and a casing secured to the board and moved in concert with the board. A post is slidably engaged through the housing and the casing and has a rack, a spindle is rotatably secured in the housing and slidably engaged through the casing, to guide the casing to move relative to the housing. A gear is rotatably secured in the casing and engaged with the rack of the post, and a worm is slidably engaged on the spindle and engaged with the gear, in order to move the post up and down when the spindle and the worm is rotated relative to the casing and the housing.

6 Claims, 7 Drawing Sheets

WORKING TABLE HAVING STABLE SUPPORT

BACKGROUND OF THE INVENTION

1. Field of the Invention

The present invention relates to a working table, and more particularly to a working table having a slidable and stable support to stably support work pieces on various working machines.

2. Description of the Prior Art

Various kinds of typical working tables have been developed for supporting work pieces on various working machines, and comprise a table movable up and down, and movable forwardly and rearwardly, and/or movable laterally, for moving the work pieces relative to the working machines, and for allowing the work pieces to be easily and precisely machined by tool members.

In order to movably support the table on the working machines, a complicated supporting structure or mechanism is required to be provided to slidably support the work pieces, in order to move the work pieces relative to the working machines. However, the complicated supporting structure or mechanism of the working machines normally may not be easily manufactured and assembled, and/or are required to be manufactured and assembled by experts or skillful persons.

In addition, the table is normally slidably supported on the working machines only, and may not be resiliently supported on the working machines, such that the table may be used to resiliently support the work pieces on the working machines.

The present invention has arisen to mitigate and/or obviate the afore-described disadvantages of the conventional working tables.

SUMMARY OF THE INVENTION

The primary objective of the present invention is to provide a working table including a slidable and stable support or table to stably support work pieces on various working machines.

The other objective of the present invention is to provide a working table including a structure that may be easily manufactured and assembled.

The further objective of the present invention is to provide a working table including a table that may be stably and resiliently supported above a housing, in order to stably and resiliently support the work pieces thereon.

In accordance with one aspect of the invention, there is provided a working table comprising a housing including a chamber formed therein, and including at least one channel and a groove formed therein and communicating with the chamber thereof, a board slidably received in the chamber of the housing, a casing secured to the board and moved in concert with the board, a post slidably engaged through the groove of the housing, and slidably engaged through the casing, a spindle rotatably secured in the housing, and slidably engaged through the casing, to guide the casing to move relative to the housing. A moving device is further provided to move the post up and down relative to the board and the housing, one or more rods are further provided and slidably engaged through the channel of the housing, and engaged through the board, and a table is disposed on top of the post and the rod, and movable up and down by the post and the moving device. The table may thus be smoothly guided to move up and down relative to the housing by the post and the moving device.

The moving device includes a rack formed in the post, a gear rotatably secured in the casing and engaged with the rack of the post, and a worm slidably engaged on the spindle and engaged with the gear, in order to move the post up and down relative to the housing and the casing when the spindle and the worm is rotated relative to the casing and the housing.

The spindle includes one or more longitudinal guiding members engaged with the worm, to guide the worm to move longitudinally along the spindle, and to prevent the worm from rotating relative to the spindle.

The board includes one or more ducts engaged through the board, and slidably engaged in the channel of the housing, the rod is slidably engaged through the duct.

A spring biasing device may further be provided to bias the rod relative to the housing, and thus to resiliently support the table above the housing.

The housing includes one or more slots formed therein, and one or more fasteners are secured to the board and slidably engaged in the slots of the housing respectively, in order to further stably guide the board to slide relative to the housing. A handle may further be provided and secured to the spindle, in order to rotate the spindle relative to the housing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
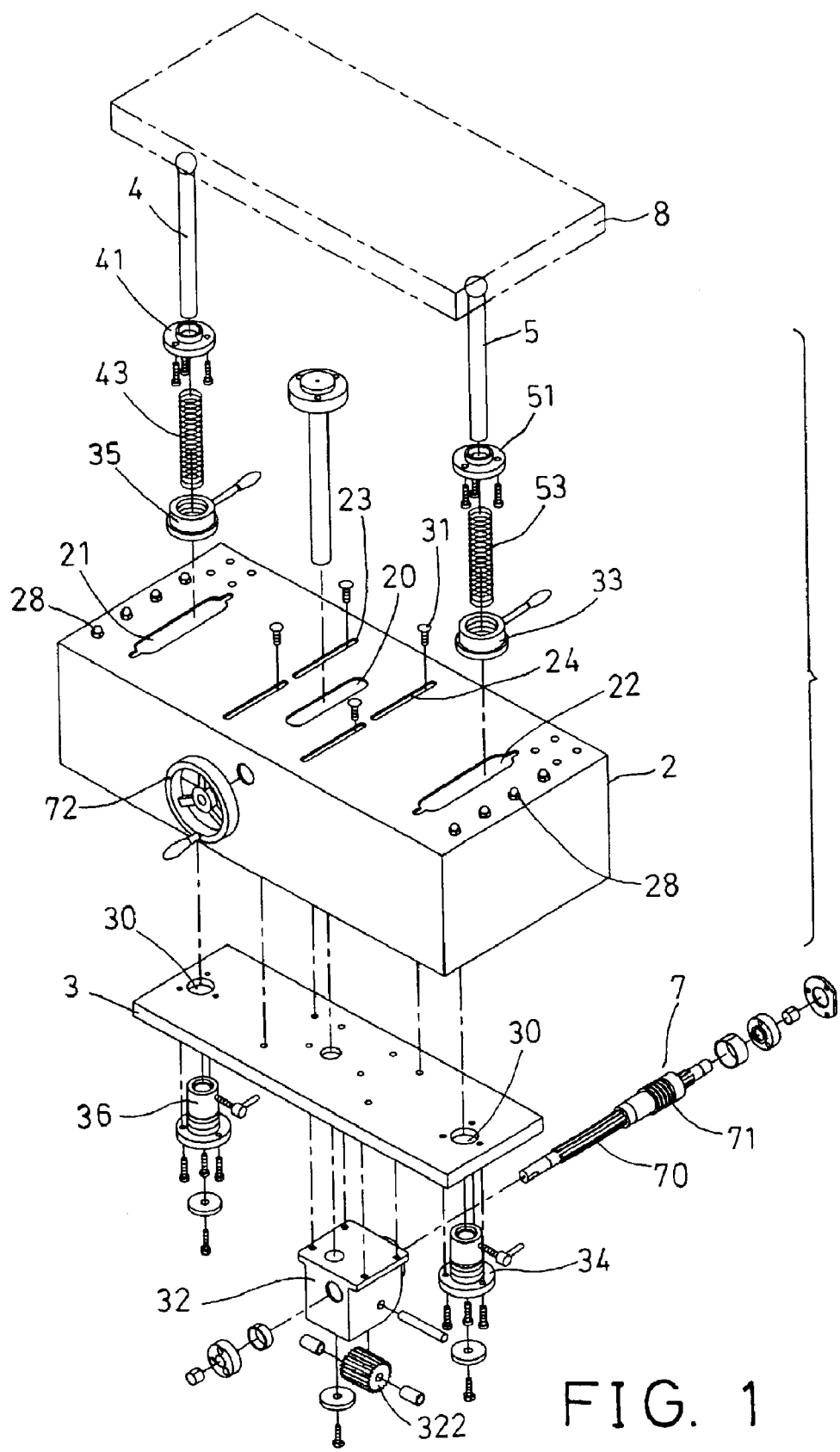
FIG. 1 is an exploded view of a working table in accordance with the present invention.
Figure 2:
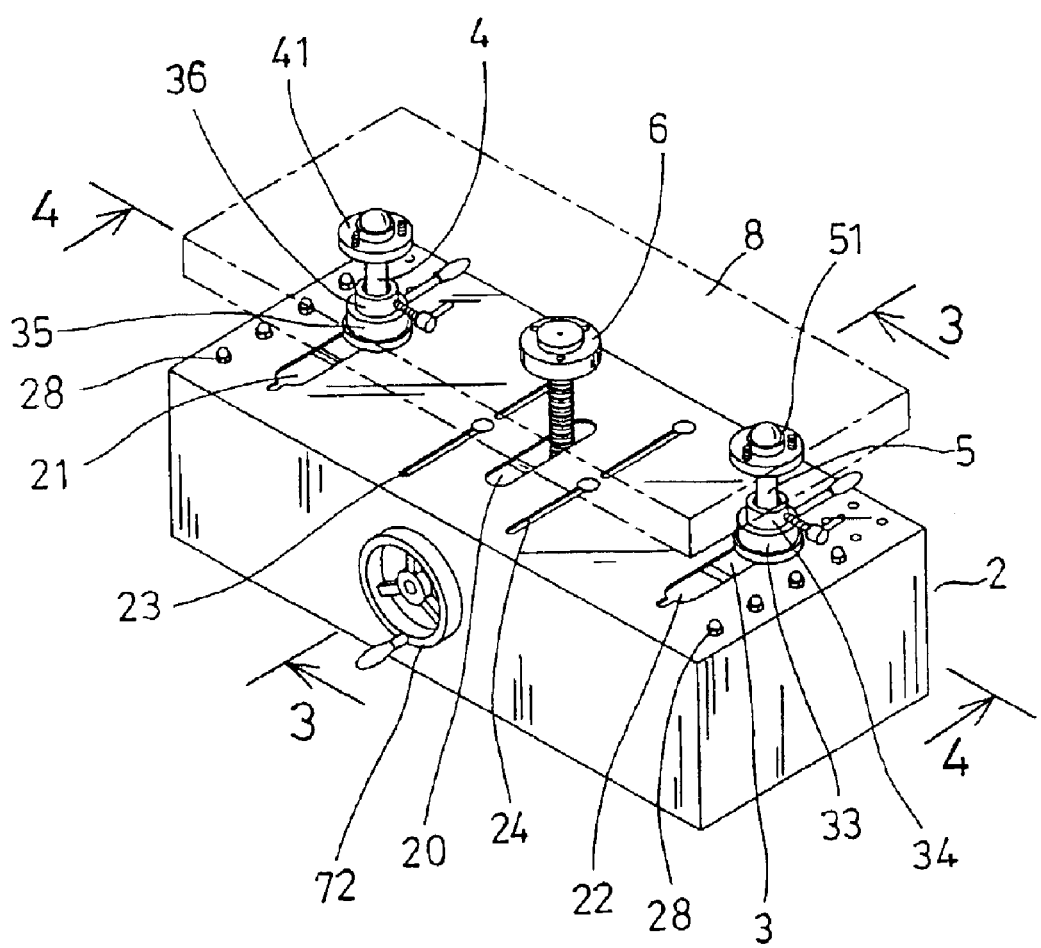
FIG. 2 is a perspective view of the working table.

Referring to the drawings, and initially to FIGS. 1–5, a working table in accordance with the present invention comprises a housing 2 including an intermediate or middle groove 20 formed therein, two side channels 21, 22 formed therein, and one or more pairs of slots 23, 24 formed in the upper portion thereof, and preferably parallel to each other. The housing 2 includes a chamber 29 formed therein (FIGS. 3–5) and communicating with the groove 20 and the channels 21, 22 and the slots 23, 24 thereof.

A board 3 is slidably received in the chamber 29 of the housing 2, and includes two sides. A number of rollers 25, 26 (FIG. 5) are rotatably secured in the sides of the housing 2 with such as shafts 28 (FIGS. 1, 2, 5) respectively, and engaged with the sides of the board 3, in order to facilitate the sliding movement of the board 3 relative to the housing 2, and for allowing the board 3 to be moved laterally, or forwardly and rearwardly relative to the housing 2, best shown in FIGS. 3 and 5. The board 3 includes two side orifices 30 formed therein for aligning with the side channels 21, 22 of the housing 2 respectively.

A casing 32 is secured to the bottom of the board 3 with such as fasteners 31, and thus moved in concert with the board 3. The fasteners 31 may optionally or selectively be slidably engaged in the slots 23, 24 of the housing 2 respectively, for selectively guiding the board 3 and the casing 32 to move along the slots 23, 24 of the housing 2. A post 6 may further be provided and slidably engaged through the middle groove 20 of the housing 2, and engaged through the board 3 and engaged into and through the casing 32 (FIGS. 3, 4).

Figure 7:
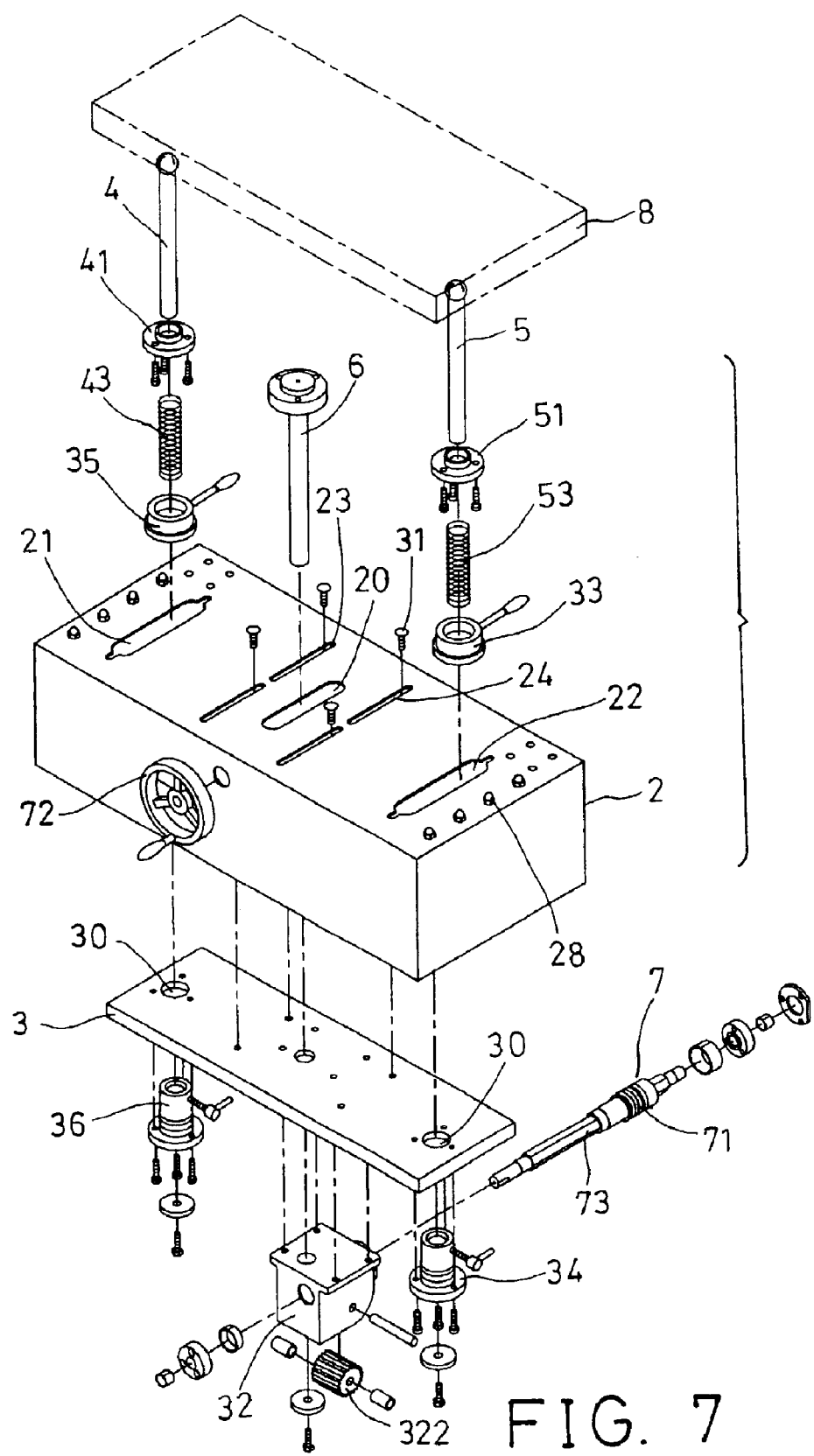
FIG. 7 is an exploded view similar to FIG. 1, illustrating the other embodiment of the working table.

A spindle 7 is rotatably secured in the housing 2, and slidably engaged through the casing 32, in order to further stably guide the casing 32 and the board 3 to move relative to the housing 2. The spindle 7 includes one or more longitudinal guiding members 70, such as slots or keys 70 (FIGS. 1, 3–5), or flat surfaces 73 (FIG. 7), and a worm 71 is slidably engaged onto the spindle 7, and includes corresponding recesses or flat surfaces for engaging with the keys 70 or the flat surfaces 73, and for preventing the worm 71 from rotating relative to the spindle 7.

Figure 3:
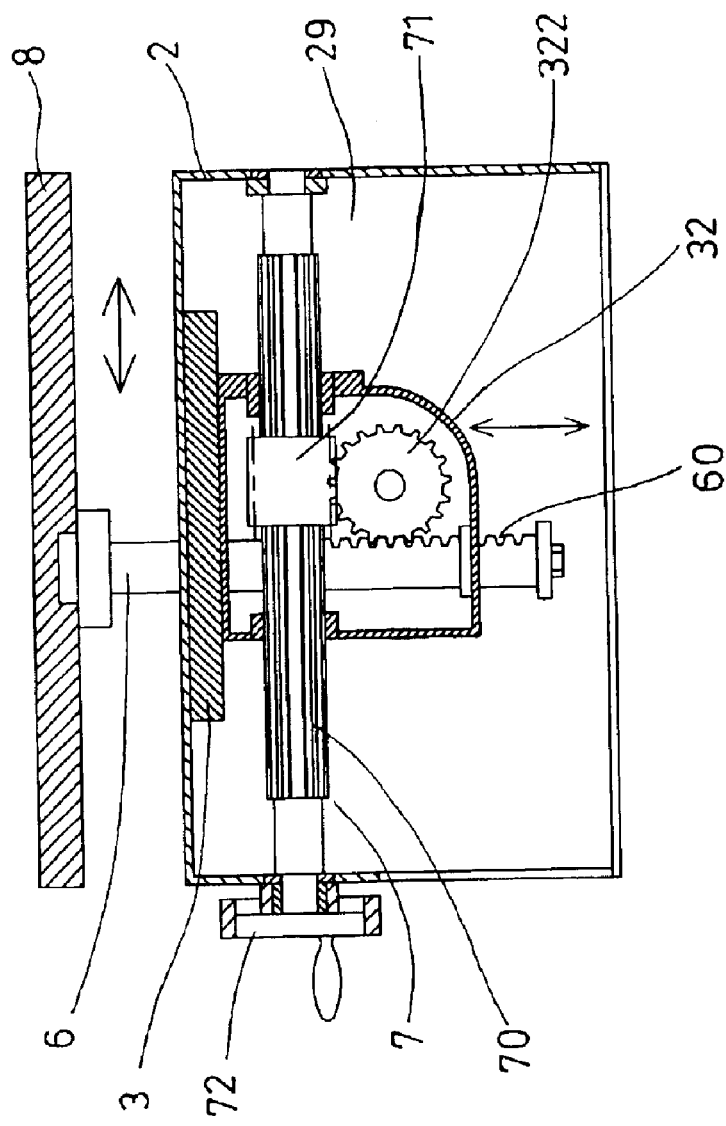
FIGS. 3, 4 are cross sectional views taken along lines 3—3 and 4—4 of FIG. 2 respectively.
Figure 4:
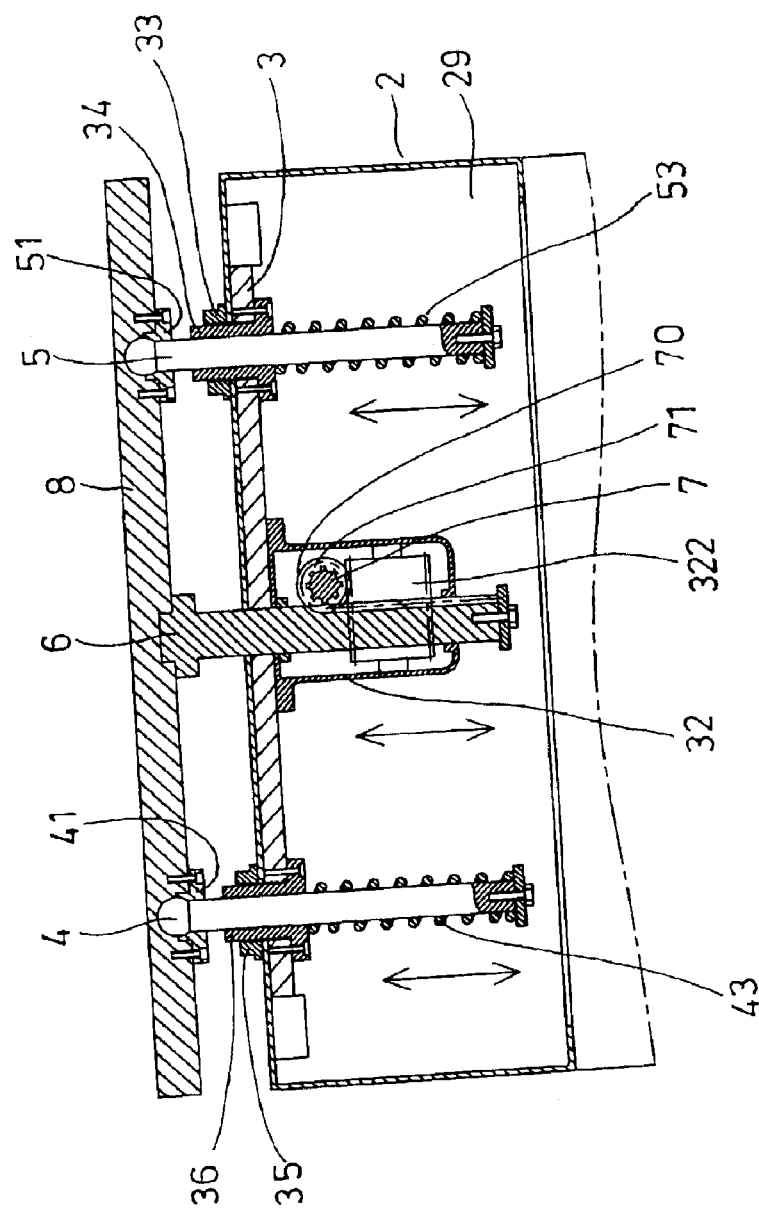
Figure 5:
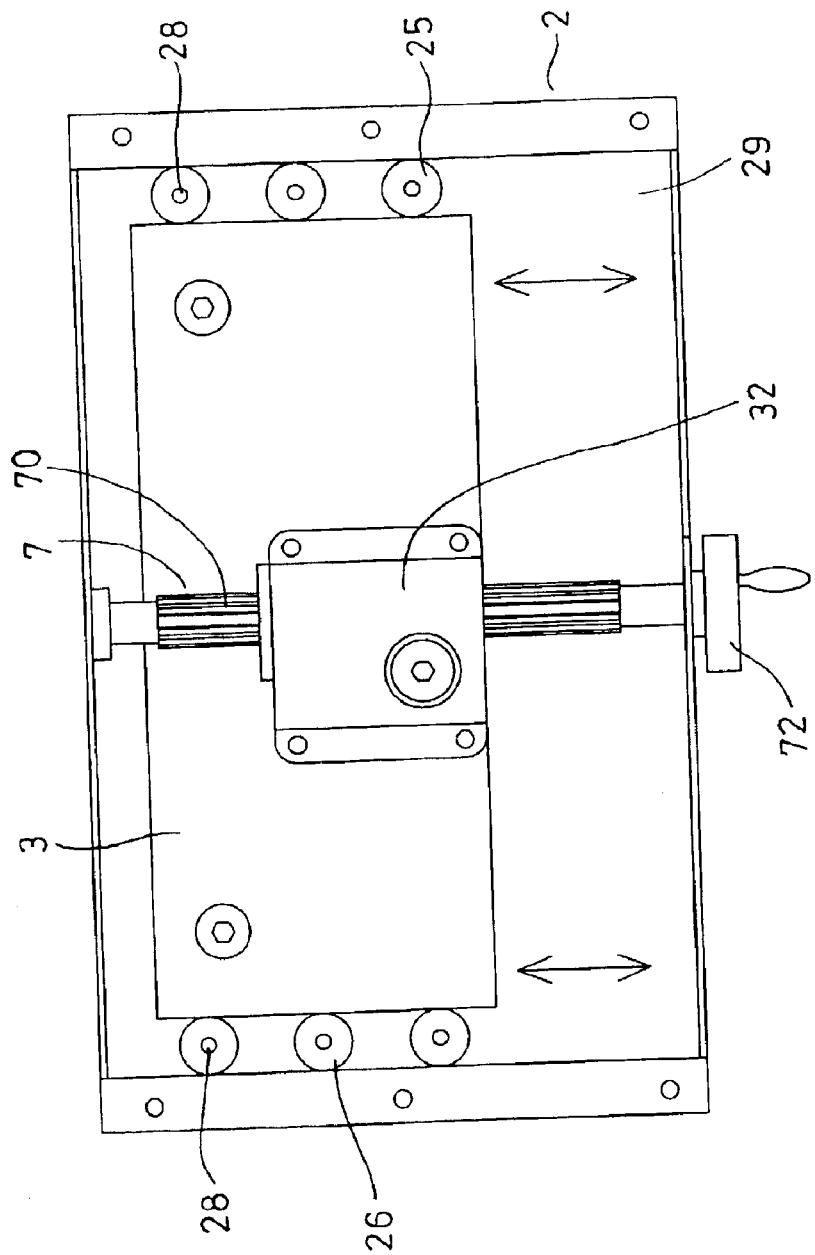
FIG. 5 is a bottom plan view of the working table.

A gear 322 is rotatably secured in the casing 32, and engaged with the worm 71 (FIGS. 3, 4). The post 6 includes a rack 60 formed thereon (FIG. 3) and engaged with the gear 322, for allowing the post 6 to be moved up and down by the gear 322 when the worm 71 and the spindle 7 is rotated relative to the housing 2. A handle 72 may be secured to the spindle 7, for rotating the spindle 7 and the worm 71 to rotate the gear 322, and thus to move the post 6 up and down relative to the housing 2 and the casing 32.

Two ducts 34, 36 are engaged through the orifices 30 of the board 3, and slidably engaged through the side channels 21, 22 of the housing 2, and secured to the board 3 with such as collars 33, 35, and/or fasteners (not shown). Two rods 5, 4 are slidably engaged through the ducts 34, 36 respectively, and include upper ends secured to bottom of a table 8 with such as brackets 51, 41, for allowing the rods 4, 5 to be moved up and down together with the table 8.

The upper end of the post 6 is engaged with the table 8 or secured to the table 8, such that the table 8 may be moved up and down by the post 6 and the gear 322 (FIG. 4) when the spindle 7 and the worm 71 are rotated relative to the board 3 and the casing 32 by the handle 72. Two springs 43, 53 are engaged on the rods 4, 5 and engaged with the ducts 36, 34 respectively, for biasing the rods 4, 5 and thus the table 8 downwardly toward the housing 2 (FIG. 4).

In operation, the board 3 may be guided to smoothly move relative to the housing 2 by the rollers 25, 26, and the casing 32 may be guided to slide along the spindle 7, and the post 6 may be guided to slide along the middle groove 20 of the housing 2, and the ducts 34, 36 and the rods 5, 4 may be guided to slide along the side channels 22, 21 of the housing 2 respectively, such that the table 8 may also be guided to smoothly move relative to the housing 2.

The table 8 may thus be smoothly moved up and down by the post 6 and the gear 322, and the worm 71 of the spindle 7, and the handle 72. In addition, the springs 43, 53 may also apply a spring biasing force against the rods 4, 5 and the table 8, for stably and resiliently supporting the table 8 above the housing 2.

Figure 6:
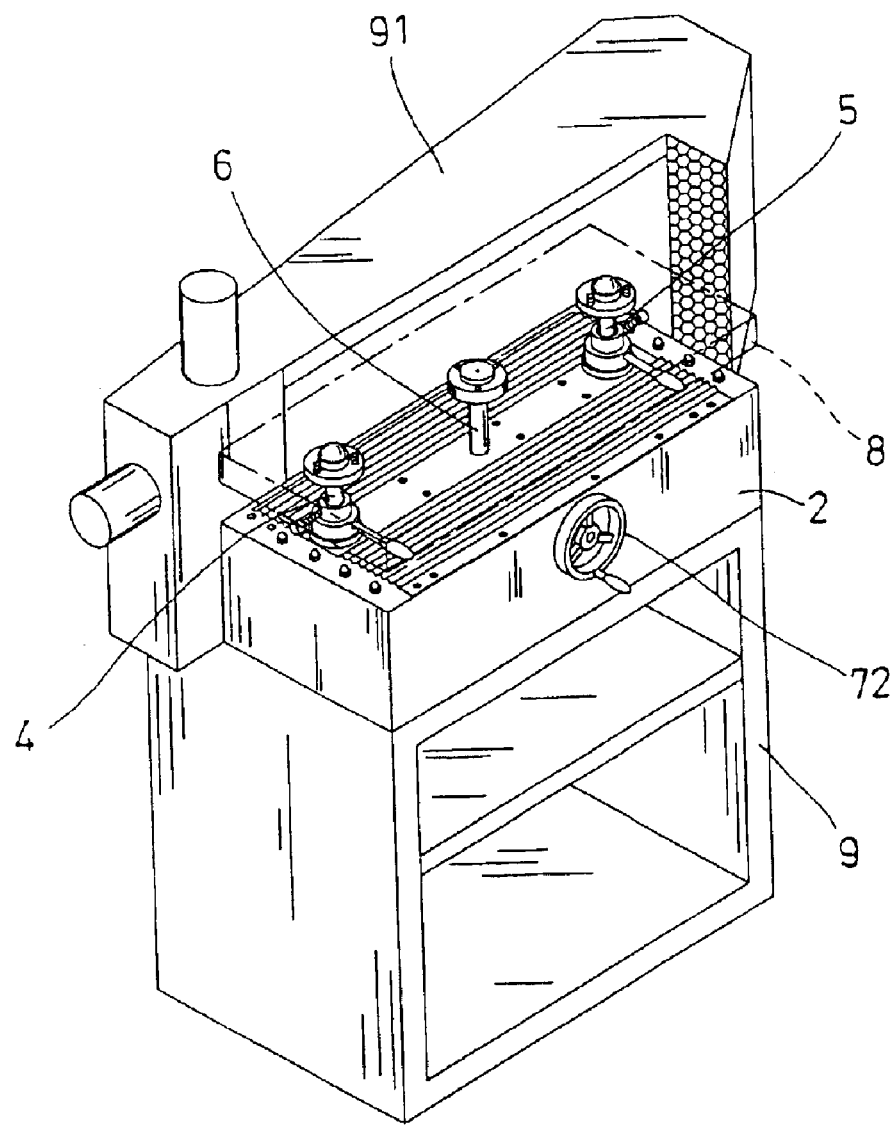
FIG. 6 is a perspective view illustrating the operation or the application of the working table.

As shown in FIG. 6, the housing 2 may be disposed on a base 9 and disposed beside various working machines 91, such as milling machines, grinding machines, drilling machines, etc., in order to stably support the work pieces, and to smoothly move the work pieces relative to the working machines 91.

Accordingly, the working table in accordance with the present invention includes a slidable and stable support to stably support work pieces on various working machines, and includes a structure that may be easily manufactured and assembled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A working table comprising:

a housing including a chamber formed therein, and including at least one channel and a groove formed therein and communicating with said chamber thereof, a board slidably received in said chamber of said housing, a casing secured to said board and moved in concert with said board, a post slidably engaged through said groove of said housing, and slidably engaged through said casing, a spindle rotatably secured in said housing, and slidably engaged through said casing, to guide said casing to move relative to said housing, moving means for moving said post up and down relative to said board and said housing, at least one rod slidably engaged through said channel of said housing, and engaged through said board, a table disposed on top of said post and said at least one rod, and movable up and down by said post and said moving means, and means for biasing said rod relative to said housing.

2. A working table comprising:

a housing including a chamber formed therein, and including at least one channel and a groove formed therein and communicating with said chamber thereof, a board slidably received in said chamber of said housing, a casing secured to said board and moved in concert with said board, a post slidably engaged through said groove of said housing, and slidably engaged through said casing, a spindle rotatably secured in said housing, and slidably engaged through said casing, to guide said casing to move relative to said housing, moving means for moving said post up and down relative to said board and said housing, said moving means including a rack formed in said post, a gear rotatably secured in said casing and engaged with said rack of said post, and a worm slidably engaged on said spindle and engaged with said gear, at least one rod slidably engaged through said channel of said housing, and engaged through said board, and a table disposed on top of said post and said at least one rod, and movable up and down by said post and said moving means.

3. The working table as claimed in claim 2, wherein said spindle includes at least one longitudinal guiding member engaged with said worm, to guide said worm to move along said spindle, and to prevent said worm from rotating relative to said spindle.

4. A working table comprising:

a housing including a chamber formed therein, and including at least one channel and a groove formed therein and communicating with said chamber thereof, a board slidably received in said chamber of said housing, a casing secured to said board and moved in concert with said board, a post slidably engaged through said groove of said housing, and slidably engaged through said casing, a spindle rotatably secured in said housing, and slidably engaged through said casing, to guide said casing to move relative to said housing, moving means for moving said post up and down relative to said board and said housing, at least one rod slidably engaged through said channel of said housing, and engaged through said board, and a table disposed on top of said post and said rod, and movable up and down by said post and said moving means, and said board including at least one duct engaged through said board, and slidably engaged in said channel of said housing, said at least one rod being slidably engaged through said at least one duct.

5. A working table comprising:

a housing including a chamber formed therein, and including at least one channel and a groove formed therein and communicating with said chamber thereof, said housing including at least one slot formed therein, a board slidably received in said chamber of said housing, at least one fastener secured to said board and slidably engaged in said slot of said housing, a casing secured to said board and moved in concert with said board, a post slidably engaged through said groove of said housing, and slidably engaged through said casing, a spindle rotatably secured in said housing, and slidably engaged through said casing, to guide said casing to move relative to said housing, moving means for moving said post up and down relative to said board and said housing, at least one rod slidably engaged through said channel of said housing, and engaged through said board, and a table disposed on top of said post and said rod, and movable up and down by said cost and said moving means.

6. The working table as claimed in claim 1 further comprising a handle secured to said spindle, to rotate said spindle relative to said housing.

* * * * *